(12) United States Patent
Seery et al.

(10) Patent No.: US 12,338,863 B2
(45) Date of Patent: Jun. 24, 2025

(54) LINEAR BEARING CLUTCH

(71) Applicant: The Johns Hopkins University, Baltimore, MD (US)

(72) Inventors: Ryan D. Seery, Washington, DC (US); Matthew S. Bailey, Baltimore, MD (US); Daniel M. Shaefer, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/434,896

(22) Filed: Feb. 7, 2024

(65) Prior Publication Data

US 2024/0280146 A1 Aug. 22, 2024

Related U.S. Application Data

(60) Provisional application No. 63/485,556, filed on Feb. 17, 2023.

(51) Int. Cl.
| | |
|---|---|
| *F16D 41/061* | (2006.01) |
| *F16B 7/14* | (2006.01) |
| *F16C 29/04* | (2006.01) |
| *F16C 29/10* | (2006.01) |
| *F16D 63/00* | (2006.01) |

(52) U.S. Cl.
CPC .......... *F16D 41/061* (2013.01); *F16B 7/1409* (2013.01); *F16C 29/04* (2013.01); *F16C 29/10* (2013.01); *F16D 63/008* (2013.01)

(58) Field of Classification Search
CPC ...... F16D 63/008; F16D 41/061; F16C 29/02; F16C 29/04; F16C 29/10; F16B 2/16; F16B 7/1409
See application file for complete search history.

(56) References Cited

U.S. PATENT DOCUMENTS

| | | | |
|---|---|---|---|
| 3,918,346 A | 11/1975 | Ziegler | |
| 4,723,851 A | 2/1988 | Troster et al. | |
| 5,988,342 A * | 11/1999 | Ito | F16D 63/008 192/144 |
| 6,957,919 B2 | 10/2005 | Kern et al. | |
| 8,616,343 B2 * | 12/2013 | Wako | F16D 63/008 188/67 |
| 2003/0019106 A1 * | 1/2003 | Pope | A61L 27/08 29/898 |
| 2011/0222807 A1 | 9/2011 | Tanoue et al. | |
| 2016/0025134 A1 | 1/2016 | Takio et al. | |

FOREIGN PATENT DOCUMENTS

| | | | |
|---|---|---|---|
| JP | 2006189102 A | * | 7/2006 |
| JP | 2007132372 A | * | 5/2007 |

* cited by examiner

*Primary Examiner* — Richard M Lorence
(74) *Attorney, Agent, or Firm* — Sung T. Kim

(57) ABSTRACT

A linear bearing clutch includes a first surface, a second surface, one or more contact elements, and a holding device. The first surface includes a tapered surface. The second surface includes a flat or curved surface. The holding device is configured to hold the one or more contact elements. The first surface is configured to permit motion of the one or more contact elements along a first direction of the second surface and restrict motion of the one or more contact elements in a second direction of the second surface, the second direction being opposite the first direction.

24 Claims, 11 Drawing Sheets

LINEAR BEARING CLUTCH

CROSS-REFERENCE TO RELATED APPLICATION

This application claims priority to U.S. Provisional Patent Application No. 63/485,556, filed Feb. 17, 2023, which is hereby incorporated herein in its entirety by reference.

FIELD

The present disclosure relates to linear bearing apparatuses, systems, and methods, for example, linear bearing clutch apparatuses, systems, and methods.

BACKGROUND

Linear bearings are a type of bearing that allow relative linear motion between two surfaces. Traditional linear bearings can be bidirectional. Shaft collars can restrict motion along a shaft but they are usually completely stationary. Other linear bearing designs may require motorized actuators (e.g., brakes) to restrict motion, but are not passive and may only toggle between stationary and bidirectional operation. Brakes are active mechanisms that receive input from a user, sensors, or both, and also utilize a suite of electronic components to power and control them. Linear ratcheting mechanisms can only lock at discrete axial positions, require a toothed shaft to operate, and may suffer from backlash.

SUMMARY

Accordingly, there is a need to develop a linear bearing clutch that is purely mechanical, passively locks in one direction without backlash, operates continuously along a smooth surface (e.g., shaft, bore), is capable of handling high thrust loads (e.g., limited only by the materials and geometry), and is compatible with a variety of form factors. This novel approach can provide a passive linear bearing clutch that does not suffer from backlash, may omit auxiliary electronics, can be in a form factor similar to that of a conventional linear bearing, retains high thrust-loading capacity, and may reduce size, weight, and complexity.

Also, the linear bearing clutch can increase reliability by being purely mechanical and passive, and can eliminate the need for actuators, batteries, controllers, and electromagnetic protection, thereby reducing risk. Further, the linear bearing clutch can be applicable to a variety of different form factors and fields including, but not limited to, aeronautics, space applications, robotics, industrial machinery, manufacturing plants, mining, drilling, and other engineering applications.

In some aspects, a linear bearing clutch can include a first surface, a second surface, one or more contact elements, and a holding device. In some aspects, the first surface can include a tapered surface. In some aspects, the second surface can include a flat or curved surface. In some aspects, the holding device can be configured to hold the one or more contact elements. In some aspects, the first surface can be configured to permit motion of the one or more contact elements along a first direction of the second surface. In some aspects, the first surface can be configured to restrict motion of the one or more contact elements in a second direction of the second surface, the second direction being opposite the first direction. In some aspects, the linear bearing clutch is unidirectional.

In some aspects, the linear bearing clutch can be configured to passively lock in the second direction without backlash.

In some aspects, the linear bearing clutch is purely mechanical. In some aspects, the linear bearing clutch can include one or more non-mechanical components.

In some aspects, in a first configuration, the linear bearing clutch can be arranged external to the second surface and the tapered surface can have a taper angle opening along the second direction. In some aspects, in a second configuration, the linear bearing clutch can be arranged internal to the second surface and the tapered surface can have a taper angle opening along the first direction. In some aspects, a coefficient of static friction between the one or more contact elements, the tapered surface, and the second surface can be greater than a tangent of the taper angle.

In some aspects, the linear bearing clutch can further include one or more actuators coupled to the one or more contact elements. In some aspects, the one or more actuators can be configured to preload the one or more contact elements into contact with both the tapered surface and the second surface simultaneously.

In some aspects, in a first configuration, the linear bearing clutch can be arranged external to the second surface. In some aspects, in the first configuration, the second surface can be between the first surface.

In some aspects, in a second configuration, the linear bearing clutch can be arranged internal to the second surface. In some aspects, in the second configuration, the first surface can be between the second surface.

In some aspects, the one or more contact elements can include ball bearings. In some aspects, the one or more contact elements can include sprags. In some aspects, the one or more contact elements can include ball bearings, sprags, or a combination thereof.

In some aspects, a system can include a shaft and a linear bearing clutch. In some aspects, the linear bearing clutch can be coupled to the shaft. In some aspects, the linear bearing clutch can include a first surface, one or more rows of one or more contact elements, and a holding device. In some aspects, the first surface can include a tapered surface. In some aspects, the holding device can be configured to hold the one or more rows of the one or more contact elements. In some aspects, the first surface can be configured to permit axial motion of the one or more contact elements along a first direction of the shaft. In some aspects, the first surface can be configured to restrict axial motion of the one or more contact elements in a second direction of the shaft, the second direction being opposite the first direction.

In some aspects, a coefficient of static friction between the one or more rows of the one or more contact elements, the tapered surface, and the shaft is greater than a tangent of a taper angle of the tapered surface.

In some aspects, in a first configuration, the linear bearing clutch can be disposed around the shaft.

In some aspects, the shaft can include a bore. In some aspects, in a second configuration, the linear bearing clutch can be disposed within the bore.

In some aspects, the linear bearing clutch can further include one or more actuators coupled to the one or more rows of the one or more contact elements. In some aspects, the one or more actuators can include one or more springs. In some aspects, the one or more actuators can be configured to preload the one or more rows of the one or more contact elements into contact with the shaft and the tapered surface.

In some aspects, the one or more actuators can be configured to preload each contact element into contact with the shaft and the tapered surface.

In some aspects, the linear bearing clutch can further include a housing configured to couple the holding device and the tapered surface.

In some aspects, the one or more rows of the one or more contact elements can include a plurality of rows of contact elements. In some aspects, the one or more rows of the one or more contact elements can include ball bearings, sprags, or a combination thereof.

In some aspects, the shaft can include a smooth exterior surface. In some aspects, the shaft can include a smooth interior surface. In some aspects, the shaft can include a smooth exterior surface, a smooth interior surface, or both. In some aspects, the shaft can have a triangular cross-section, an elliptical cross-section, a circular cross-section, a rectangular cross-section, a square cross-section, or an arbitrary cross-section.

In some aspects, a method of designing a linear bearing clutch can include selecting materials of a shaft and a linear bearing clutch coupled to the shaft. In some aspects, the linear bearing clutch can include contact elements and a tapered surface. In some aspects, the method can further include selecting geometries of the shaft, the contact elements, and the tapered surface. In some aspects, the tapered surface can have a taper angle. In some aspects, a coefficient of static friction between the contact elements, the tapered surface, and the shaft can be greater than a tangent of the taper angle.

In some aspects, the selecting geometries can include selecting a number of contact elements of the linear bearing clutch.

In some aspects, the selecting geometries can include selecting a first configuration in which the linear bearing clutch is disposed around the shaft.

In some aspects, the selecting geometries can include selecting a second configuration in which the linear bearing clutch is disposed within the shaft.

Implementations of any of the techniques described above may include a system, a method, a process, a device, and/or an apparatus. The details of one or more implementations are set forth in the accompanying drawings and the description below. Other features will be apparent from the description and drawings, and from the claims.

Further features and exemplary aspects of the present disclosure, as well as the structure and operation of various aspects, are described in detail below with reference to the accompanying drawings. It is noted that the aspects are not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the aspects and, together with the description, further serve to explain the principles of the aspects and to enable a person skilled in the relevant art(s) to make and use the aspects.

Figure 1:
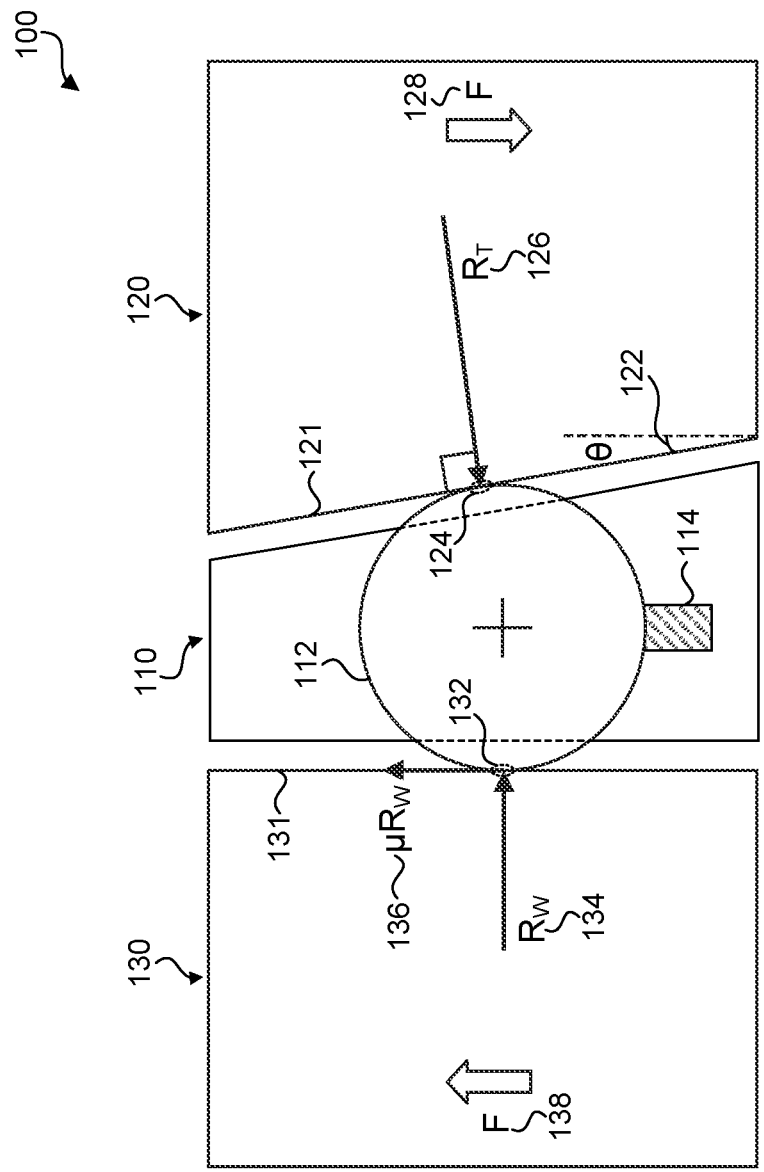
FIG. 1 is a schematic cross-sectional illustration of a linear bearing clutch, according to an exemplary aspect.

The features and exemplary aspects of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

Provided herein are system, apparatus, device, method, and/or computer program product aspects, and/or combinations and sub-combinations thereof, for linear bearing clutches that can permit motion in a first direction and restrict motion in a second direction opposite the first direction.

A linear bearing clutch as described below can have a tapered surface, one or more contact elements, and a holding device to hold the one or more contact elements to permit motion of the one or more contact elements along a first direction of a smooth surface and restrict motion of the one or more contact elements in a second direction of the smooth surface opposite the first direction.

This specification discloses one or more aspects that incorporate the features of this present disclosure. The disclosed aspect(s) merely exemplify the present disclosure. The scope of the disclosure is not limited to the disclosed aspect(s). The present disclosure is defined by the claims appended hereto.

The aspect(s) described, and references in the specification to "one aspect," "an aspect," "an example aspect," "an exemplary aspect," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is understood that it is within the knowledge of one skilled in the art to effect such feature, structure, or characteristic in connection with other aspects whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

Numerical values, including endpoints of ranges, can be expressed herein as approximations preceded by the term "about," "substantially," "approximately," or the like. In such cases, other aspects include the particular numerical value. Regardless of whether a numerical value is expressed as an approximation, two aspects are included in this disclosure: one expressed as an approximation, and another not expressed as an approximation. It will be further understood that an endpoint of each range is significant both in relation to another endpoint, and independently of another endpoint.

Aspects of the disclosure may be implemented in hardware, firmware, software, or any combination thereof. Aspects of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

The term "coefficient of static friction" or "μ" as used herein indicates a dimensionless scalar value equal to a ratio of the force of friction between two bodies at rest relative to each other and the force pressing them together. The coefficient of static friction depends on the materials used, and coefficients of static friction can range from zero to greater than one. The static friction force must be overcome by an applied force before an object can move. The maximum possible friction force between two surfaces before sliding begins equals the product of the coefficient of static friction and the normal force: $F_{max} = \mu F_N$.

The term "taper angle" or "θ" as used herein indicates an opening angle of a tapered surface in contact with one or more contact elements. In some aspects, the tapered surface can have a taper angle (θ), and a coefficient of static friction (μ) between the tapered surface (e.g., a race) and the one or more contact elements (e.g., ball bearings, sprags) can be greater than a tangent of the taper angle (θ), such that $\mu > \tan(\theta)$.

Exemplary Linear Bearing Clutches

As discussed above, traditional linear bearings can be bidirectional. Shaft collars can restrict motion along a shaft but they are usually completely stationary. Other linear bearing designs may require motorized actuators (e.g., brakes) to restrict motion, but are not passive and may only toggle between stationary and bidirectional operation. Brakes are active mechanisms that receive input from a user, sensors, or both, and also utilize a suite of electronic components to power and control them. Linear ratcheting mechanisms can only lock at discrete axial positions, require a toothed shaft to operate, and may suffer from backlash.

Aspects of linear bearing clutch apparatuses, systems, and methods as discussed below can provide a passive linear bearing clutch that is purely mechanical, locks in one direction without backlash, operates continuously along a smooth surface (e.g., shaft, bore), retains high thrust load capacities (e.g., limited only by the materials and geometry), and is compatible with a variety of form factors.

Figure 2:
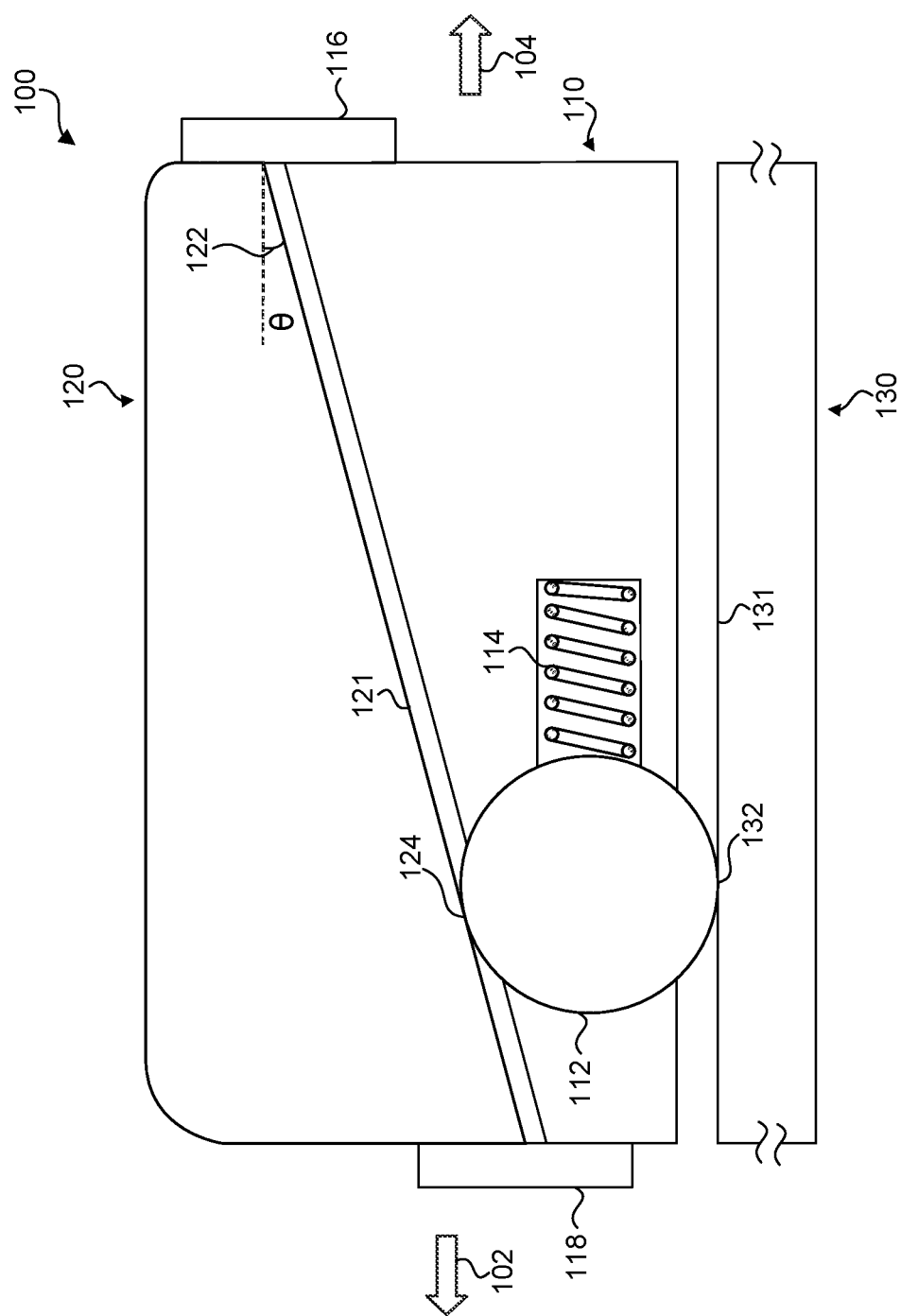
FIG. 2 is a schematic cross-sectional illustration of a linear bearing clutch, according to an exemplary aspect.

FIGS. 1 and 2 illustrate linear bearing clutch 100, according to various exemplary aspects. Linear bearing clutch 100 can be configured to move freely in one direction and passively lock in an opposite direction without backlash. Linear bearing clutch 100 can be further configured to be simple and purely mechanical. Linear bearing clutch 100 can be further configured to operate continuously (e.g., externally, internally) along a smooth surface (e.g., shaft, bore) as opposed to at discrete locations. Linear bearing clutch 100 can be further configured to retain a high thrust-loading capacity (e.g., limited only by the materials and geometry). Linear bearing clutch 100 can be further configured to be compatible with a variety of different form factors.

Although linear bearing clutch 100 is shown in FIGS. 1 and 2 as a stand-alone apparatus and/or system, the aspects of this disclosure can be used with other apparatuses, systems, and/or methods, such as, but not limited to, elements in FIGS. 3-8, 8A, 8B, and 9, e.g., linear bearing clutch 100', linear bearing clutch 100", taper locking function 510, linear bearing clutch 600, and/or flow diagram 900.

As shown in FIGS. 1 and 2, linear bearing clutch 100 can include cage 110, first surface 120, and second surface 130. In some aspects, linear bearing clutch 100 can move freely in one direction and passively restrict motion in an opposite direction. For example, as shown in FIG. 2, linear bearing clutch 100 can move freely in first direction 102 along second surface 130 and passively lock in second direction 104 along second surface 130, opposite first direction 102. As shown in FIGS. 1 and 2, cage 110 can be disposed between first surface 120 and second surface 130.

Cage 110 can be configured to hold one or more contact elements 112. Cage 110 can be further configured to support contact elements 112 between first surface 120 and second surface 130. In some aspects, cage 110 can include a metal, a ceramic, a polymer (e.g., plastic, rubber, polyester, polyethylene, HDPE, nylon, PTFE, carbon fiber, thermoplastic, etc.), or any other suitable material to support and secure contact elements 112 in place. As shown in FIGS. 1 and 2, cage 110 can include one or more contact elements 112 and one or more actuators 114.

Contact elements 112 can be configured to contact first surface 120 and second surface 130. In some aspects, contact elements 112 can be configured to contact first surface 120 at first contact point 124 and contact second surface 130 at second contact point 132. In some aspects, contact elements 112 can include ball bearings. In some aspects, contact elements 112 can include sprags. In some aspects, contact elements 112 can include ball bearings, sprags, or a combination thereof.

In some aspects, contact elements 112 can include a metal (e.g., steel, stainless steel, iron, tungsten, molybdenum, aluminum, nickel, titanium, copper, etc.), an alloy (e.g., brass, bronze, monel, invar, etc.), a ceramic (e.g., sapphire, ruby, garnet, diamond, silicon carbide, tungsten carbide, silicon nitride, silicon oxide, glass, calcium oxide, zirconia oxide, magnesium oxide, etc.), a polymer (e.g., polyester, polyethylene, HDPE, nylon, PTFE, carbon fiber, etc.), any other rigid material with a high Young's modulus (e.g., at least 1 GPa), or a combination thereof.

Figure 3:
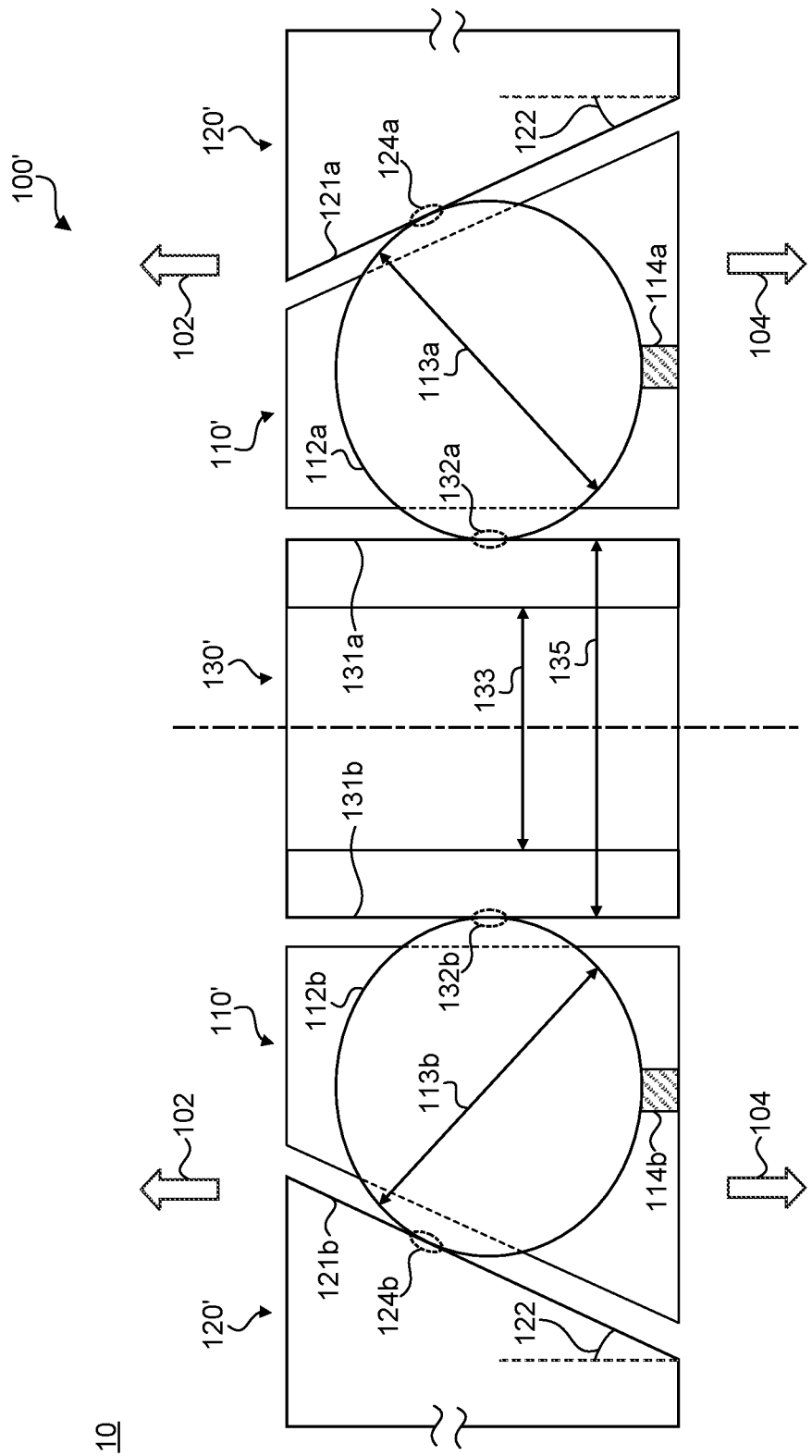
FIG. 3 is a schematic cross-sectional illustration of a linear bearing clutch in a first configuration, according to an exemplary aspect.
Figure 6:
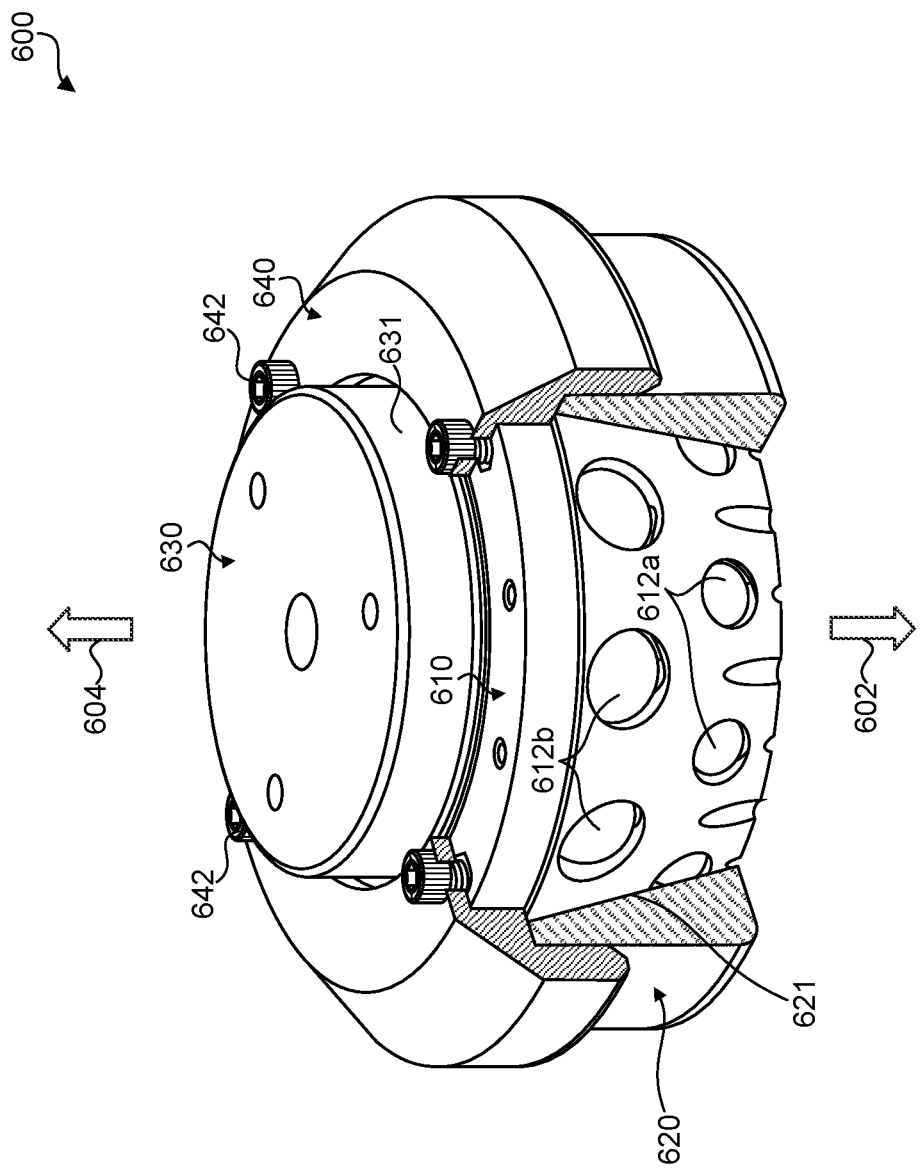
FIG. 6 is a schematic isometric perspective illustration of a linear bearing clutch, according to an exemplary aspect.

In some aspects, contact elements 112 can include a plurality of contact elements. For example, as shown in FIG. 3, radial cage 110' can support first and second contact elements 112a, 112b. In some aspects, contact elements 112 can be arranged in one or more rows. For example, as shown in FIG. 6, radial cage 610 can support first and second rows of contact elements 612a, 612b. In some aspects, contact elements 112 can be the same (e.g., same diameter, same material, etc.). In some aspects, contact elements 112 can be different (e.g., different diameter, different material, etc.).

Actuators 114 can be configured to preload contact elements 112 into contact with first contact surface 121 (e.g., tapered). As shown in FIGS. 1 and 2, actuators 114 can be coupled to contact elements 112 and disposed within cage 110. In some aspects, actuators 114 can include mechanical actuators, mechanical springs, constant force springs, gas springs, counterweights, pistons, cams, power screw, or any other actuators capable of applying a force to contact elements 112. For example, as shown in FIG. 2, actuators 114 can include mechanical springs.

First surface 120 can be configured to permit motion of contact elements 112 along first direction 102 (e.g., free direction) of second surface 130. First surface 120 can be further configured to restrict motion of contact elements 112 in second direction 104 (e.g., locking direction) of second surface 130, second direction 104 being opposite first direction 102. As shown in FIGS. 1 and 2, first surface 120 can include first contact surface 121, taper angle ($\theta$) 122, first contact point 124, first reaction force ($R_T$) 126, and first applied force (F) 128.

As shown in FIG. 1, first reaction force ($R_T$) 126 is orthogonal to first contact surface 121 and is applied to contact element 112 at first contact point 124. First applied force (F) 128 is equal to first reaction force ($R_T$) 126 multiplied by a sine of taper angle ($\theta$) 122, such that $F=R_T\cdot\sin(\theta)$.

In some aspects, first surface 120 can include a tapered surface. For example, as shown in FIGS. 1 and 2, first surface 120 can include first contact surface 121 that is tapered and has taper angle ($\theta$) 122 opening along first direction 102. In some aspects, taper angle ($\theta$) 122 can be in a range from about 0 degrees to about 90 degrees. In some aspects, taper angle ($\theta$) 122 can be in a range from about 30 degrees to about 60 degrees, for example, about 45 degrees. In some aspects, taper angle ($\theta$) 122 can be in a range from about 0 degrees to about 45 degrees, for example, about 30 degrees. In some aspects, taper angle ($\theta$) 122 can be in a range from about 5 degrees to about 35 degrees, for example, about 20 degrees.

In some aspects, first surface 120 can include a metal (e.g., steel, stainless steel, iron, tungsten, molybdenum, aluminum, nickel, titanium, copper, etc.), an alloy (e.g., brass, bronze, monel, invar, etc.), a ceramic (e.g., sapphire, ruby, garnet, diamond, silicon carbide, tungsten carbide, silicon nitride, silicon oxide, glass, calcium oxide, zirconia oxide, magnesium oxide, etc.), a polymer (e.g., polyester, polyethylene, HDPE, nylon, PTFE, carbon fiber, etc.), any other rigid material with a high Young's modulus (e.g., at least 1 GPa), or a combination thereof.

Second surface 130 can be configured to be coupled to contact elements 112 and move relative to first surface 120. As shown in FIGS. 1 and 2, second surface 130 can include second contact surface 131, second contact point 132, second reaction force ($R_W$) 134, frictional force ($\mu R_W$) 136, and second applied force (F) 138.

As shown in FIG. 1, second reaction force ($R_W$) 134 is orthogonal to second contact surface 131 and is applied to contact element 112 at second contact point 132. In static equilibrium (balanced forces), first applied force (F) 128 is equal and opposite to second applied force (F) 138 (vertical component), and second reaction force ($R_W$) 134 is equal and opposite to first reaction force ($R_T$) 126 multiplied by a cosine of taper angle ($\theta$) 122 (horizontal component), such that $R_W=R_T\cdot\cos(\theta)$.

In order for linear bearing clutch 100 to passively lock in second direction 104 (e.g., no sliding), frictional force ($\mu R_W$) 136 must be greater than first applied force (F) 128, such that $\mu R_W > F$. Using the above relationships for first applied force (F) 128 and second reaction force ($R_W$) 134 shows that that $\mu(R_T\cdot\cos(\theta))>(R_T\cdot\sin(\theta))$. Rearranging and substituting $\tan(\theta)=\sin(\theta)/\cos(\theta)$ shows that locking for linear bearing clutch 100 occurs when $\mu>\tan(\theta)$, where $\mu$ is a coefficient of static friction between contact element 112, first surface 120 (e.g., tapered), and second surface 130 of linear bearing clutch 100 and $\theta$ is taper angle ($\theta$) 122 of first surface 120.

In some aspects, second surface 130 can include a wall or a floor. In some aspects, second surface 130 can include a shaft. In some aspects, second surface 130 can include a bore. In some aspects, second surface 130 can include a triangular surface, a rectangular surface, a squared surface, an elliptical surface, a circular surface, any other polygonal surface, or combination thereof. In some aspects, second surface 130 can include a smooth exterior surface. In some aspects, second surface 130 can include a smooth interior surface. In some aspects, second surface 130 can include a smooth exterior surface, a smooth interior surface, or both. In some aspects, second surface 130 can have a triangular cross-section, a rectangular cross-section, a square cross-section, an elliptical cross-section, a circular cross-section, any other polygonal cross-section, or combination thereof.

In some aspects, second surface 130 can include a metal (e.g., steel, stainless steel, iron, tungsten, molybdenum, aluminum, nickel, titanium, copper, etc.), an alloy (e.g., brass, bronze, monel, invar, etc.), a ceramic (e.g., sapphire, ruby, garnet, diamond, silicon carbide, tungsten carbide, silicon nitride, silicon oxide, glass, calcium oxide, zirconia oxide, magnesium oxide, etc.), a polymer (e.g., polyester, polyethylene, HDPE, nylon, PTFE, carbon fiber, etc.), earthen materials (e.g., rock, stone, concrete, sand, etc.), or any other rigid material with a high Young's modulus (e.g., at least 1 GPa).

In some aspects, a coefficient of static friction ($\mu$) between contact elements 112, first surface 120 (e.g., tapered), and second surface 130 of linear bearing clutch 100 can be greater than a tangent of taper angle ($\theta$) 122, such that $\mu>\tan(\theta)$. For example, for taper angle ($\theta$) 122 of about 20 degrees, a coefficient of static friction ($\mu$) must be at least 0.37 for linear bearing clutch 100 to passively lock in second direction 104. In some aspects, a coefficient of static friction ($\mu$) between contact elements 112, first surface 120 (e.g., tapered), and second surface 130 of linear bearing clutch 100 can be in a range from about 0 to about 10. In some aspects, a coefficient of static friction (µ) between contact elements 112, first surface 120 (e.g., tapered), and second surface 130 of linear bearing clutch 100 can be in a range from about 0 to about 1. In some aspects, a coefficient of static friction (µ) between contact elements 112, first surface 120 (e.g., tapered), and second surface 130 of linear bearing clutch 100 can be in a range from about 0.2 to about 0.8.

In some aspects, locking of linear bearing clutch 100 can depend only on the materials and geometry of contact elements 112, first surface 120 (e.g., tapered), and second surface 130. For example, linear bearing clutch 100 can passively lock in second direction 104 without backlash until the applied force (e.g., thrust load) causes plastic deformation of one or more of contact elements 112, first surface 120 (e.g., tapered), and second surface 130, thereby degrading the coefficient of static friction (µ) until µ>tan(θ) no longer holds.

In some aspects, linear bearing clutch 100 can passively lock in second direction 104 without backlash. In some aspects, linear bearing clutch 100 can passively lock in second direction 104 with a backlash or displacement (slippage) of less than about 0.2 inches (about 5 mm).

In some aspects, linear bearing clutch 100 can be purely mechanical. In some aspects, linear bearing clutch 100 can omit any auxiliary electronics, motorized actuators, batteries, controllers, and/or electromagnetic protection, thereby increasing reliability and reducing risk of failure during operation.

In some aspects, linear bearing clutch 100 can include a housing configured to couple cage 110 and first surface 120. For example, as shown in FIG. 2, linear bearing clutch 100 can include first coupling 116, second coupling 118, or both to secure cage 110 and first surface 120 together. In some aspects, first coupling 116, second coupling 118, or both can be connected to couple cage 110 and first surface 120 via one or more securement devices (e.g., bolts, screws, etc.). In some aspects, first coupling 116 and/or second coupling 118 can be part of cage 110. In some aspects, first coupling 116 and/or second coupling 118 can be part of first surface 120.

In some aspects, a coefficient of static friction (µ) between contact elements 112, first surface 120 (e.g., tapered), and second surface 130 of linear bearing clutch 100 can be predetermined. For example, the coefficient of static friction (µ) can be based on the materials, the geometry, the allowable Hertzian stresses, the contact areas, and the constraint that µ>tan(θ). In some aspects, taper angle (θ) 122 of first surface 120 can be predetermined. For example, taper angle (θ) 122 can be based on the materials, the geometry, the allowable Hertzian stresses, the contact areas, the coefficient of static friction (µ), and the constraint that µ>tan(θ).

In some aspects, the coefficient of static friction (µ) and taper angle (θ) 122 can be determined based on an optimization model or optimization algorithm to optimize a set of parameters of linear bearing clutch 100. In some aspects, the parameters can include taper orientation (e.g., linear bearing clutch 100 in first configuration 10 (external), linear bearing clutch 100 in second configuration 20 (internal)), diameter of contact elements 112, diameter of second surface 130, taper angle (θ) 122, number of contact elements 112, coefficient of static friction (µ) between contact elements 112 and first surface 120 (e.g., tapered), coefficient of static friction (µ) between contact elements 112 and second surface 130, material of contact elements 112 (e.g., Young's modulus, Poisson's ratio, allowable Hertzian stress), material of first surface 120 (e.g., Young's modulus, Poisson's ratio, allowable Hertzian stress), material of second surface 130 (e.g., Young's modulus, Poisson's ratio, allowable Hertzian stress), contact area between contact element 112 and first surface 120 (e.g., Hertzian force, max pressure, deflection, contact stiffness), contact area between contact element 112 and second surface 130 (e.g., Hertzian force, max pressure, deflection, contact stiffness), maximum allowable Hertzian force per contact element 112 on first surface 120, maximum allowable Hertzian force per contact element 112 on second surface 130, maximum allowable axial load, maximum system deflection, system stiffness, or a combination thereof.

In some aspects, a model of linear bearing clutch 100 based on the set of parameters and constraint µ>tan(θ) can be defined. In some aspects, an inverse optimization of the set of parameters and constraint µ>tan(θ) can be performed such that the model of linear bearing clutch 100 determines a geometry (e.g., taper angle (θ) 122, number of contact elements 112, etc.) based on desired materials, or determines appropriate materials (e.g., coefficient of static friction (µ), Young's modulus, etc.) based on a desired geometry. In some aspects, an inverse optimization of the set of parameters can be performed such that the model of linear bearing clutch 100 produces a desired geometry and/or a desired set of materials. In some aspects, the optimization model or optimization algorithm can include simulated annealing, gradient descent, finite difference, interpolation, population models, regression, parameter adaptation, supervised machine learning, unsupervised machine learning, neural networks, classification models, clustering, vector quantization, stochastic gradient descent, implicit updates, leaky averaging, momentum methods, adaptive gradient (AdaGrad), backpropagation, root mean square propagation (RMSProp), adaptive moment estimation (Adam), or a combination thereof. In some aspects, the inverse optimization can be performed by an optimization algorithm.

In some aspects, linear bearing clutch 100 can be arranged in a first configuration such that cage 110 (with contact elements 112) and first surface 120 (e.g., tapered) of linear bearing clutch 100 are arranged external to second surface 130. For example, as shown in FIG. 3, linear bearing clutch 100' in first configuration 10 (external) can include radial cage 110' (with contact elements 112a, 112b) and tapered surface 120' arranged external to shaft 130'.

Figure 4:
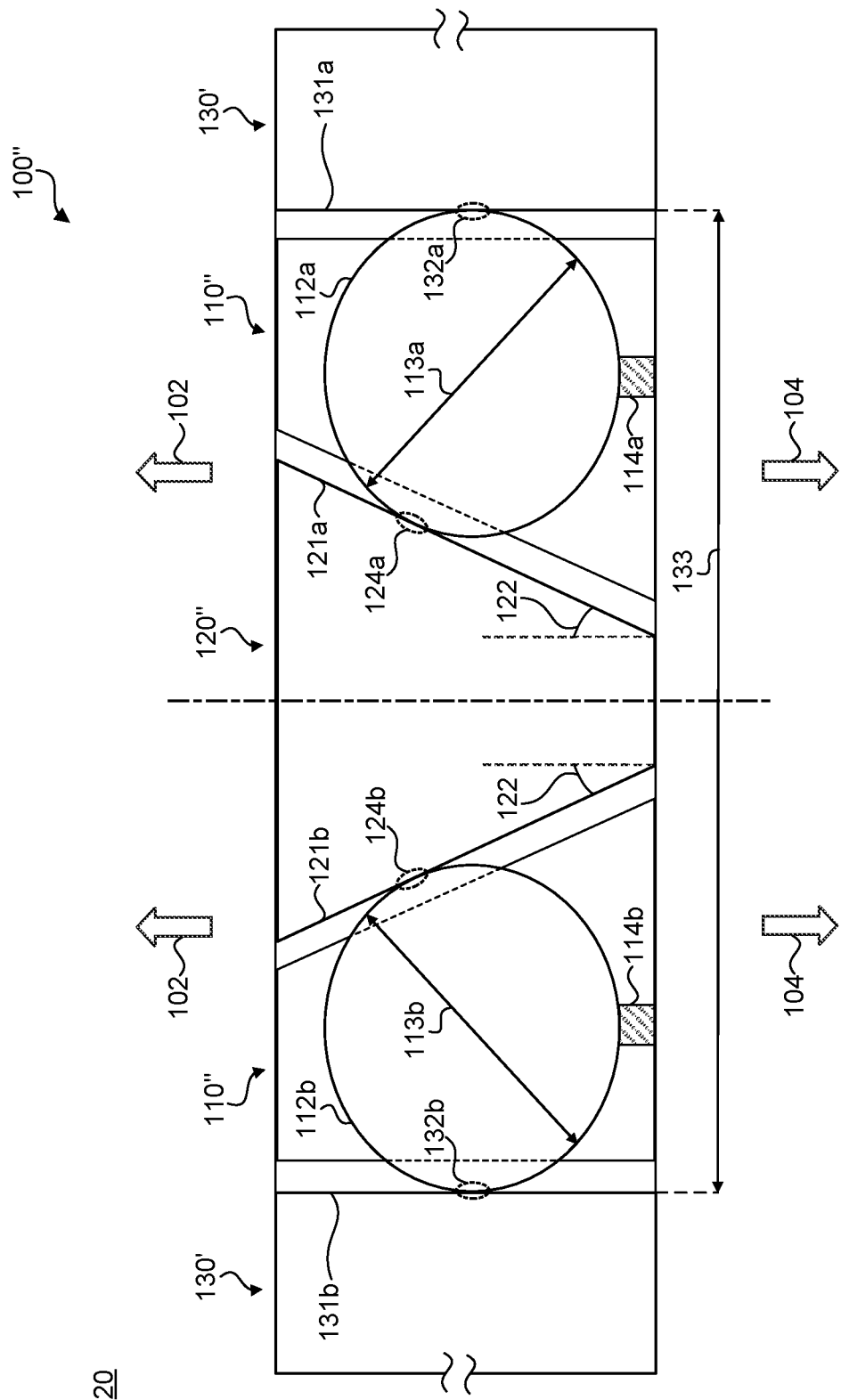
FIG. 4 is a schematic cross-sectional illustration of a linear bearing clutch in a second configuration, according to an exemplary aspect.

In some aspects, linear bearing clutch 100 can be arranged in a second configuration such that cage 110 (with contact elements 112) and first surface 120 (e.g., tapered) of linear bearing clutch 100 are arranged internal to second surface 130. For example, as shown in FIG. 4, linear bearing clutch 100" in second configuration 20 (internal) can include inverted radial cage 110" (with contact elements 112a, 112b) and inverted tapered surface 120" arranged internal to shaft 130'.

FIG. 3 illustrates linear bearing clutch 100' in first configuration 10 (external), according to an exemplary aspect. Linear bearing clutch 100' can be configured to move freely in one direction and passively lock in an opposite direction without backlash. Linear bearing clutch 100' can be further configured to operate continuously along an external smooth surface (e.g., shaft). Linear bearing clutch 100' can be further configured to retain a high thrust-loading capacity (e.g., limited only by the materials and geometry). Linear bearing clutch 100' can be further configured to be compatible with a variety of different form factors.

Although linear bearing clutch 100' is shown in FIG. 3 as a stand-alone apparatus and/or system, the aspects of this disclosure can be used with other apparatuses, systems, and/or methods, such as, but not limited to, elements in FIGS. 1, 2, 4-8, 8A, 8B, and 9, e.g., linear bearing clutch 100, linear bearing clutch 100", taper locking function 510, linear bearing clutch 600, and/or flow diagram 900.

The aspects of linear bearing clutch 100 shown in FIGS. 1 and 2, for example, and the aspects of linear bearing clutch 100' shown in FIG. 3 may be similar. Similar reference numbers are used to indicate features of the aspects of linear bearing clutch 100 shown in FIGS. 1 and 2 and the similar features of the aspects of linear bearing clutch 100' shown in FIG. 3. One difference between the aspects of linear bearing clutch 100 shown in FIGS. 1 and 2 and the similar features of the aspects of linear bearing clutch 100' shown in FIG. 3 is that linear bearing clutch 100' is in first configuration 10 (external) with radial cage 110', holding first and second contact elements 112a, 112b, and tapered surface 120' external to shaft 130', rather than linear bearing clutch 100 with cage 110, first surface 120, and second surface 130 shown in FIGS. 1 and 2.

As shown in FIG. 3, linear bearing clutch 100' can be in first configuration 10 (external) and include radial cage 110', tapered surface 120', and shaft 130'. In some aspects, linear bearing clutch 100' can move freely in one direction and passively restrict motion in an opposite direction. For example, as shown in FIG. 3, linear bearing clutch 100' (e.g., radial cage 110' and tapered surface 120') can move freely in first direction 102 along shaft 130' and passively lock in second direction 104 along shaft 130', opposite first direction 102. As shown in FIG. 3, radial cage 110' can be disposed between tapered surface 120' and shaft 130' in first configuration 10 (external), such that radial cage 110' and tapered surface 120' are external to shaft 130' (e.g., concentrically).

Radial cage 110' can be configured to hold first and second contact elements 112a, 112b. Radial cage 110' can be further configured to support first and second contact elements 112a, 112b between tapered surface 120' and shaft 130'. In some aspects, radial cage 110' can be disposed radially about shaft 130'. As shown in FIG. 3, radial cage 110' can include two or more contact elements 112a, 112b and two or more actuators 114a, 114b. In some aspects, two or more contact elements 112a, 112b (e.g., ball bearings) can have contact element diameters 113a, 113b, respectively. In some aspects, two or more contact elements 112a, 112b can be configured to contact first contact surfaces 121a, 121b of tapered surface 120' at first contact points 124a, 124b and contact second contact surfaces 131a, 131b of shaft 130' at second contact points 132a, 132b, respectively.

Radial cage 110' is similar to cage 110 shown in FIGS. 1 and 2 and similar reference numbers are used to indicate the similar features of cage 110 shown in FIGS. 1 and 2 and radial cage 110' shown in FIG. 3. Discussion of radial cage 110' components, properties, and/or functionality (e.g., contact elements 112a, 112b, actuators 114a, 114b) is not duplicated here for brevity, but the aspects and features of each are similar to cage 110 described above.

Tapered surface 120' can be configured to permit motion of contact elements 112a, 112b along first direction 102 (e.g., free direction) of shaft 130'. Tapered surface 120' can be further configured to restrict motion of contact elements 112a, 112b in second direction 104 (e.g., locking direction) of shaft 130', second direction 104 being opposite first direction 102. As shown in FIG. 3, tapered surface 120' can include first contact surfaces 121a, 121b, taper angle (θ) 122, and first contact points 124a, 124b.

Tapered surface 120' is similar to first surface 120 shown in FIGS. 1 and 2 and similar reference numbers are used to indicate the similar features of first surface 120 shown in FIGS. 1 and 2 and tapered surface 120' shown in FIG. 3. Discussion of tapered surface 120' components, properties, and/or functionality (e.g., first contact surfaces 121a, 121b, taper angle (θ) 122) is not duplicated here for brevity, but the aspects and features of each are similar to first surface 120 described above.

Shaft 130' can be configured to be coupled to contact elements 112a, 112b and move relative to tapered surface 120'. As shown in FIG. 3, shaft 130' can include second contact surfaces 131a, 131b, second contact points 132a, 132b, shaft inner diameter 133, and shaft outer diameter 135.

Shaft 130' is similar to second surface 130 shown in FIGS. 1 and 2 and similar reference numbers are used to indicate the similar features of second surface 130 shown in FIGS. 1 and 2 and shaft 130' shown in FIG. 3. Discussion of shaft 130' components, properties, and/or functionality (e.g., second contact surfaces 131a, 131b) is not duplicated here for brevity, but the aspects and features of each are similar to second surface 130 described above.

FIG. 4 illustrates linear bearing clutch 100" in second configuration 20 (internal), according to an exemplary aspect. Linear bearing clutch 100" can be configured to move freely in one direction and passively lock in an opposite direction without backlash. Linear bearing clutch 100" can be further configured to operate continuously along an internal smooth surface (e.g., shaft, bore). Linear bearing clutch 100" can be further configured to retain a high thrust-loading capacity (e.g., limited only by the materials and geometry). Linear bearing clutch 100" can be further configured to be compatible with a variety of different form factors.

Although linear bearing clutch 100" is shown in FIG. 4 as a stand-alone apparatus and/or system, the aspects of this disclosure can be used with other apparatuses, systems, and/or methods, such as, but not limited to, elements in FIGS. 1-3, 5-8, 8A, 8B, and 9, e.g., linear bearing clutch 100, linear bearing clutch 100', taper locking function 510, linear bearing clutch 600, and/or flow diagram 900.

The aspects of linear bearing clutch 100' shown in FIG. 3, for example, and the aspects of linear bearing clutch 100" shown in FIG. 4 may be similar. Similar reference numbers are used to indicate features of the aspects of linear bearing clutch 100' shown in FIG. 3 and the similar features of the aspects of linear bearing clutch 100" shown in FIG. 4. One difference between the aspects of linear bearing clutch 100' shown in FIG. 3 and the similar features of the aspects of linear bearing clutch 100" shown in FIG. 4 is that linear bearing clutch 100" is in second configuration 20 (internal) with inverted radial cage 110", holding first and second contact elements 112a, 112b, and inverted tapered surface 120" internal to shaft 130', rather than linear bearing clutch 100' in first configuration 10 (external) with radial cage 110' and tapered surface 120' external to shaft 130' shown in FIG. 3.

As shown in FIG. 4, linear bearing clutch 100" can be in second configuration 20 (internal) and include inverted radial cage 110", inverted tapered surface 120", and shaft 130'. In some aspects, linear bearing clutch 100" can move freely in one direction and passively restrict motion in an opposite direction. For example, as shown in FIG. 4, linear bearing clutch 100" (e.g., inverted radial cage 110" and inverted tapered surface 120") can move freely in first direction 102 along shaft 130' and passively lock in second direction 104 along shaft 130', opposite first direction 102. As shown in FIG. 4, inverted radial cage 110" can be disposed between inverted tapered surface 120" and shaft 130' in second configuration 20 (internal), such that radial cage 110' and inverted tapered surface 120" and inverted radial cage 110" are internal to shaft 130' (e.g., concentrically).

Inverted radial cage 110" is similar to radial cage 110' shown in FIG. 3 and similar reference numbers are used to indicate the similar features of radial cage 110' shown in FIG. 3 and inverted radial cage 110" shown in FIG. 4. Discussion of inverted radial cage 110" components, properties, and/or functionality (e.g., contact elements 112a, 112b, actuators 114a, 114b) is not duplicated here for brevity, but the aspects and features of each are similar to cage 110 and radial cage 110' described above.

Inverted tapered surface 120" is similar to tapered surface 120' shown in FIG. 3 and similar reference numbers are used to indicate the similar features of tapered surface 120' shown in FIG. 3 and inverted tapered surface 120" shown in FIG. 4. Discussion of inverted tapered surface 120" components, properties, and/or functionality (e.g., first contact surfaces 121a, 121b, taper angle (θ) 122) is not duplicated here for brevity, but the aspects and features of each are similar to first surface 120 and tapered surface 120' described above.

Exemplary Taper Angle Dependence

Figure 5:
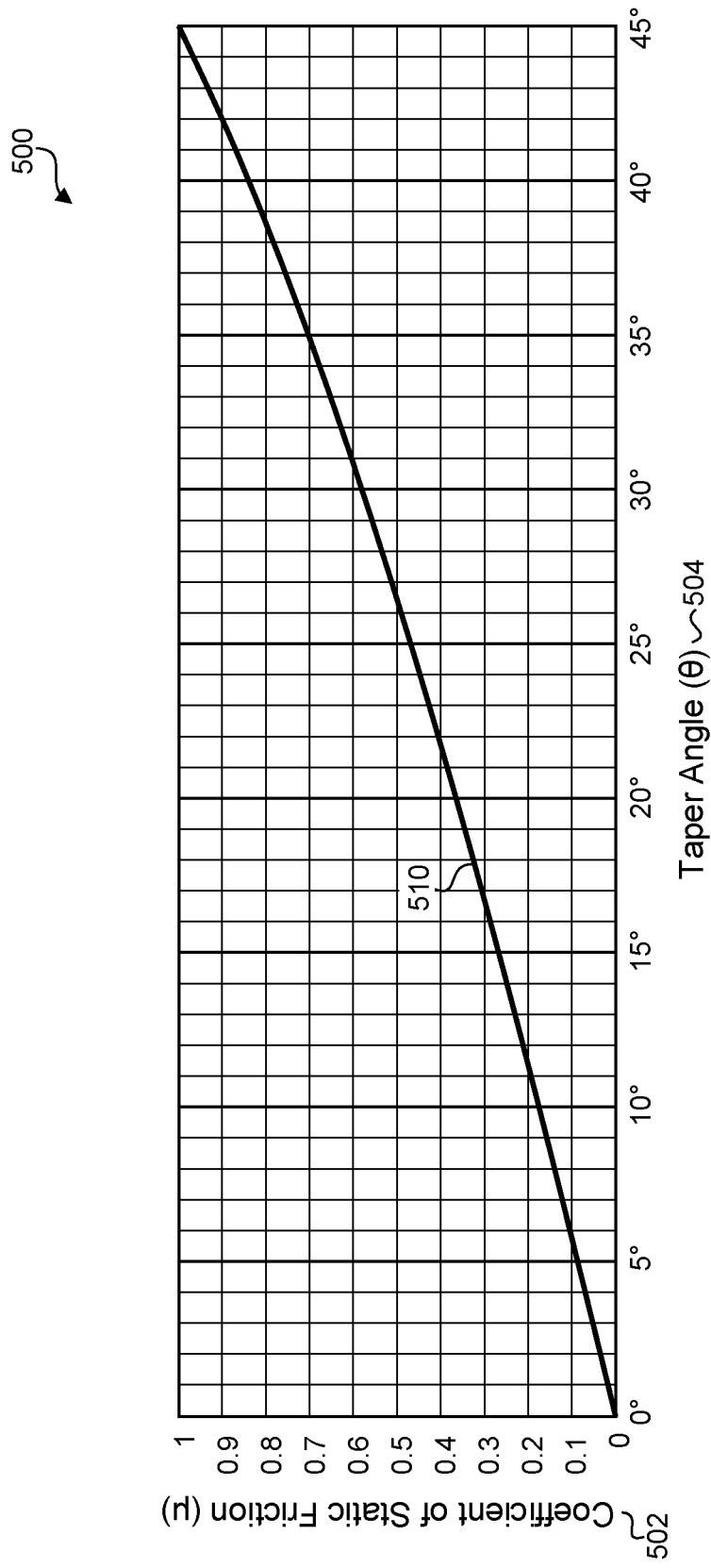
FIG. 5 shows a plot of the tangent of the taper angle of a linear bearing clutch, according to an exemplary aspect.
Figure 8:
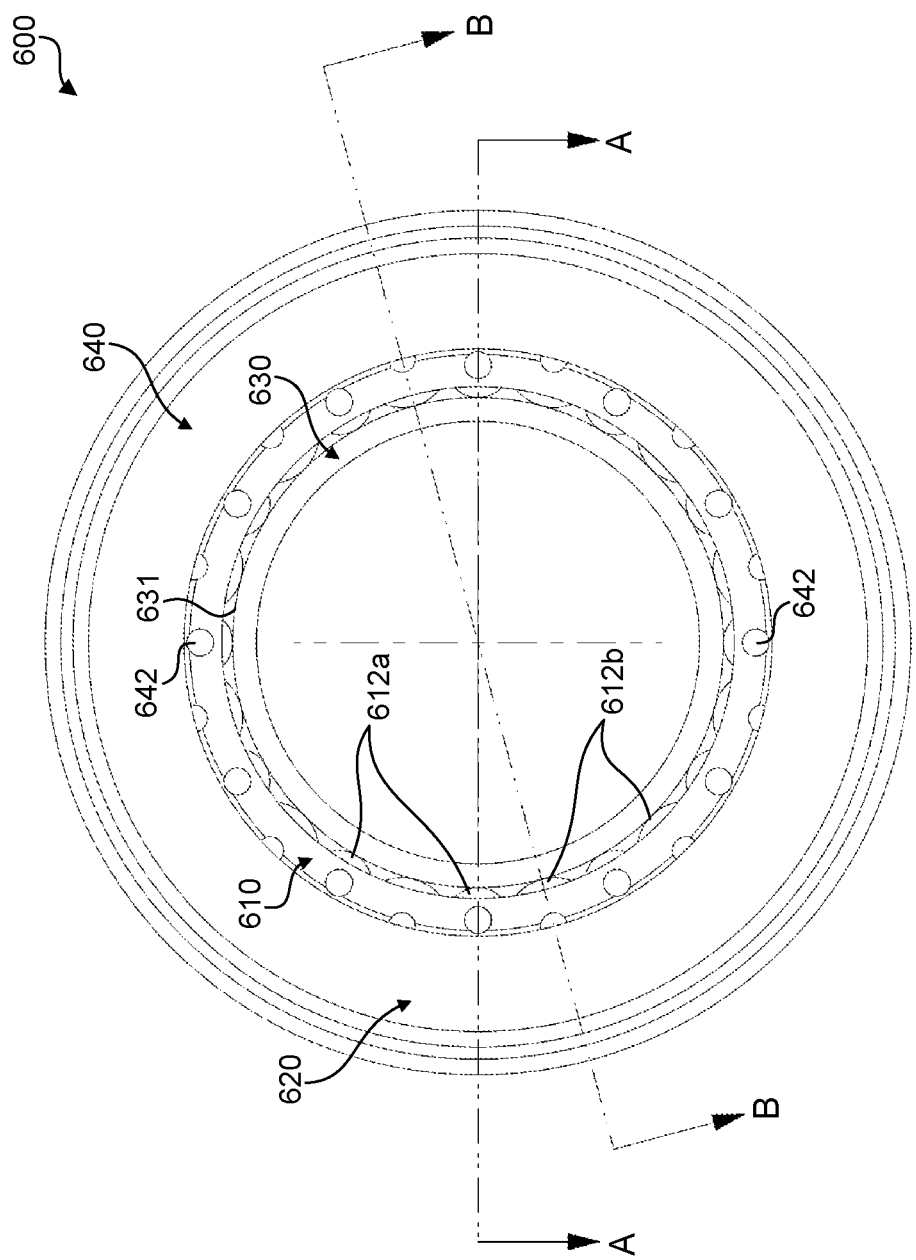
FIG. 8 is a schematic axial illustration of the linear bearing clutch shown in FIG. 6.
Figure 8A:
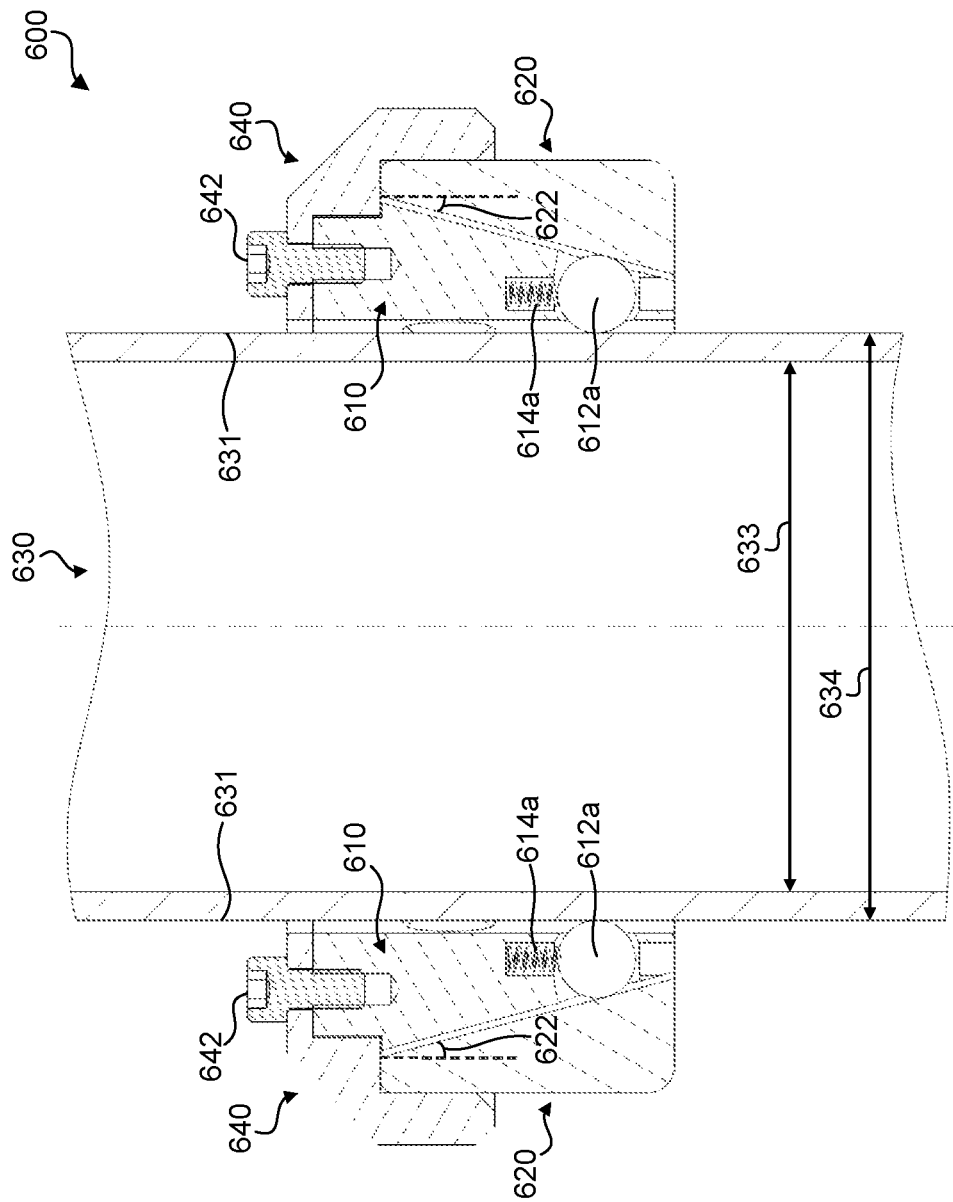
FIG. 8A is a cross-sectional view of the linear bearing clutch shown in FIG. 8 with a first row of contact elements.
Figure 8B:
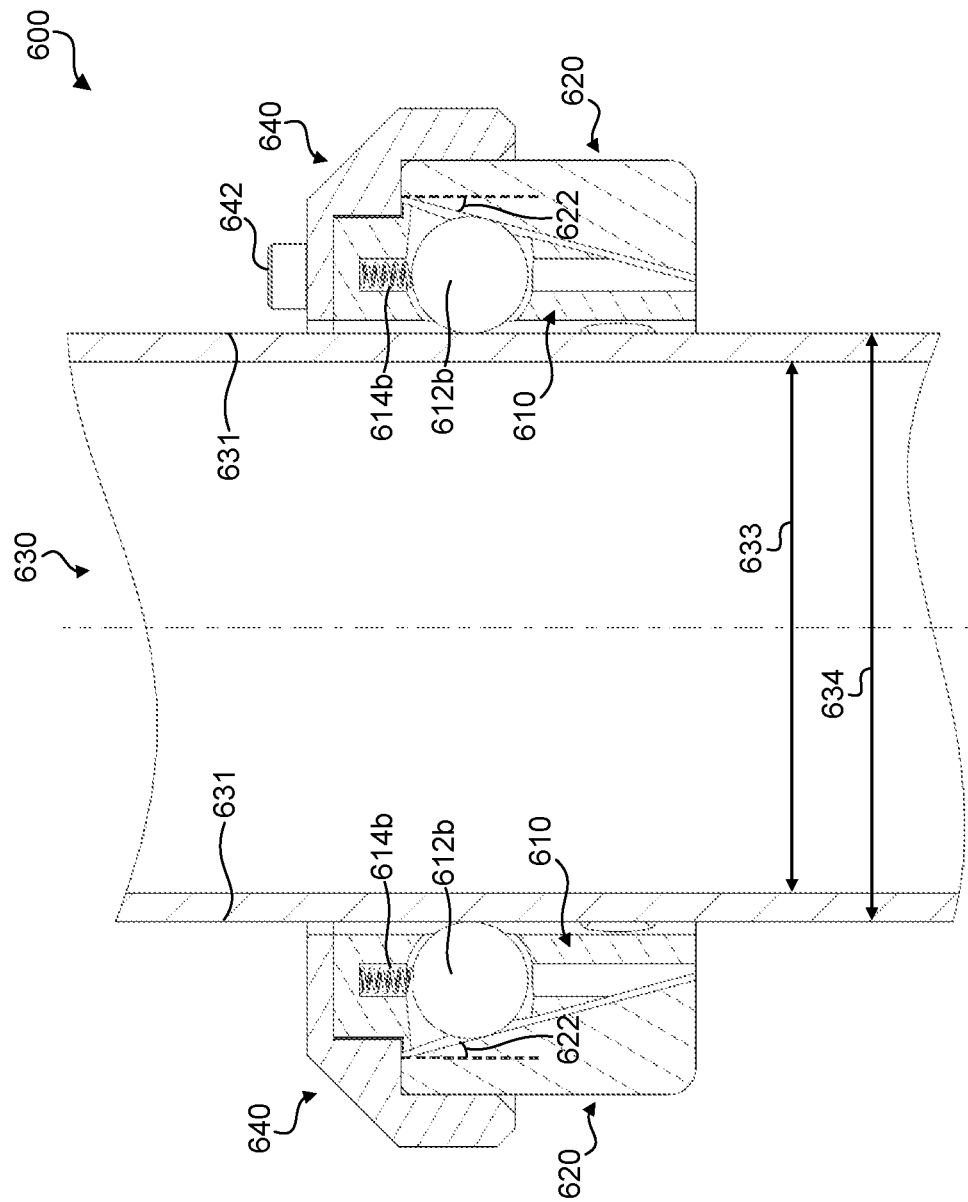
FIG. 8B is a cross-sectional view of the linear bearing clutch shown in FIG. 8 with a second row of contact elements.
Figure 9:
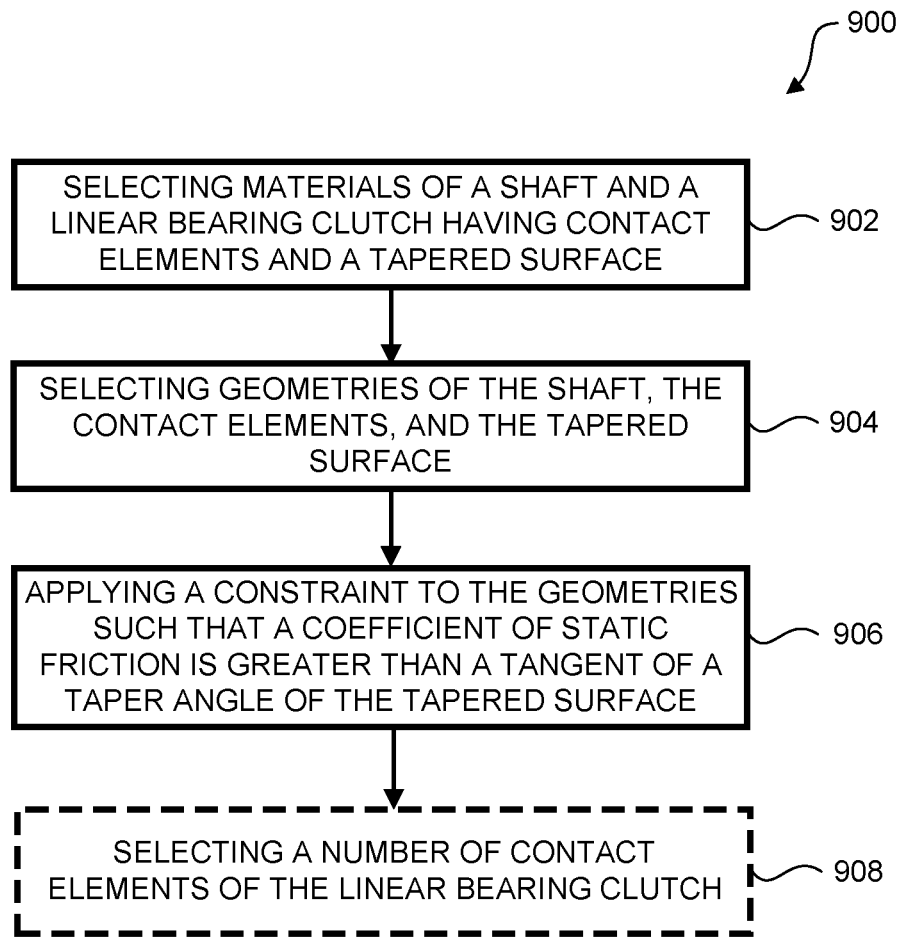
FIG. 9 illustrates a flow diagram for designing a linear bearing clutch, according to an exemplary aspect.

FIG. 5 shows plot 500 of taper locking function 510 of one or more linear bearing clutches (e.g., linear bearing clutches 100 (FIG. 1), 100' (FIG. 3), 100" (FIG. 4), 600 (FIG. 6)), according to an exemplary aspect. Although taper locking function 510 is shown in FIG. 5 as a stand-alone apparatus and/or system, the aspects of this disclosure can be used with other apparatuses, systems, and/or methods, such as, but not limited to, elements in FIGS. 1-4, 6-8, 8A, 8B, and 9, e.g., linear bearing clutch 100, linear bearing clutch 100', linear bearing clutch 100", linear bearing clutch 600, and/or flow diagram 900 (FIG. 9).

As shown in FIG. 5, plot 500 shows coefficients of static friction (μ) 502, for example, between contact elements 112, first surface 120 (e.g., tapered), and second surface 130, of one or more linear bearing clutches as a function of taper angle (θ) 504 (e.g., taper angle (θ) 122). Plot 500 includes taper locking function 510 corresponding to how the coefficient of static friction (μ) 502 for a given set of materials (e.g., stainless steel, etc.) changes for different taper angles (θ) 504 to maintain the constraint that μ>tan(θ).

In some aspects, taper locking function 510 can be used to design a linear bearing clutch based on selected materials and geometries of the linear bearing clutch, for example, shaft 130', contact elements 112a, 112b, and tapered surface 120' of linear bearing clutch 100'. In some aspects, taper locking function 510 can be determined based on an optimization model or optimization algorithm to optimize a set of parameters of a linear bearing clutch, including, but not limited to, taper orientation (e.g., external, internal), geometry (e.g., taper angle, diameters, contact areas), materials (e.g., Young's modulus, Poisson's ratio, allowable Hertzian stress), coefficients of static friction (μ), or a combination thereof. In some aspects, a model of the linear bearing clutch can be based on the set of parameters, taper locking function 510, and the constraint μ>tan(θ).

Exemplary Linear Bearing Clutch with Rows of Contact Elements

FIGS. 6-8, 8A, and 8B illustrate linear bearing clutch 600, according to various exemplary aspects. Linear bearing clutch 600 can be configured to move freely in one direction and passively lock in an opposite direction without backlash. Linear bearing clutch 600 can be further configured to operate continuously along an external smooth surface (e.g., shaft). Linear bearing clutch 600 can be further configured to retain a high thrust-loading capacity (e.g., limited only by the materials and geometry). Linear bearing clutch 600 can be further configured to be compatible with a variety of different form factors.

Although linear bearing clutch 600 is shown in FIGS. 6-8, 8A, and 8B as a stand-alone apparatus and/or system, the aspects of this disclosure can be used with other apparatuses, systems, and/or methods, such as, but not limited to, elements in FIGS. 1-5 and 9, e.g., linear bearing clutch 100, linear bearing clutch 100', linear bearing clutch 100", taper locking function 510, and/or flow diagram 900.

The aspects of linear bearing clutch 100' shown in FIG. 3, for example, and the aspects of linear bearing clutch 600 shown in FIGS. 6-8, 8A, and 8B may be similar. Similar reference numbers are used to indicate features of the aspects of linear bearing clutch 100' shown in FIG. 3 and the similar features of the aspects of linear bearing clutch 600 shown in FIGS. 6-8, 8A, and 8B. One difference between the aspects of linear bearing clutch 100' shown in FIG. 3 and the similar features of the aspects of linear bearing clutch 600 shown in FIGS. 6-8, 8A, and 8B is that linear bearing clutch 600 includes radial cage 610 with first and second rows of contact elements 612a, 612b and housing 640, rather than linear bearing clutch 100' with radial cage 110' shown in FIG. 3.

As shown in FIG. 6, linear bearing clutch 600 can include radial cage 610, tapered surface 620, shaft 630, and housing 640. In some aspects, linear bearing clutch 600 can move freely in one direction and passively restrict motion in an opposite direction. For example, as shown in FIG. 6, linear bearing clutch 600 (e.g., radial cage 610, tapered surface 620, and housing 640) can move freely in first direction 602 along shaft 630 and passively lock in second direction 604 along shaft 630, opposite first direction 602. As shown in FIGS. 6, 8A, and 8B, radial cage 610 can be disposed between tapered surface 620 and shaft 630. In some aspects, linear bearing clutch 600 can be arranged in a first configuration (e.g., first configuration 10 shown in FIG. 3) such that radial cage 610 and tapered surface 620 are external to shaft 630 (e.g., concentrically). In some aspects, linear bearing clutch 600 can be arranged in a second configuration (e.g., second configuration 20 shown in FIG. 4) such that tapered surface 620 and radial cage 610 are internal to shaft 630 (e.g., concentrically).

Figure 7:
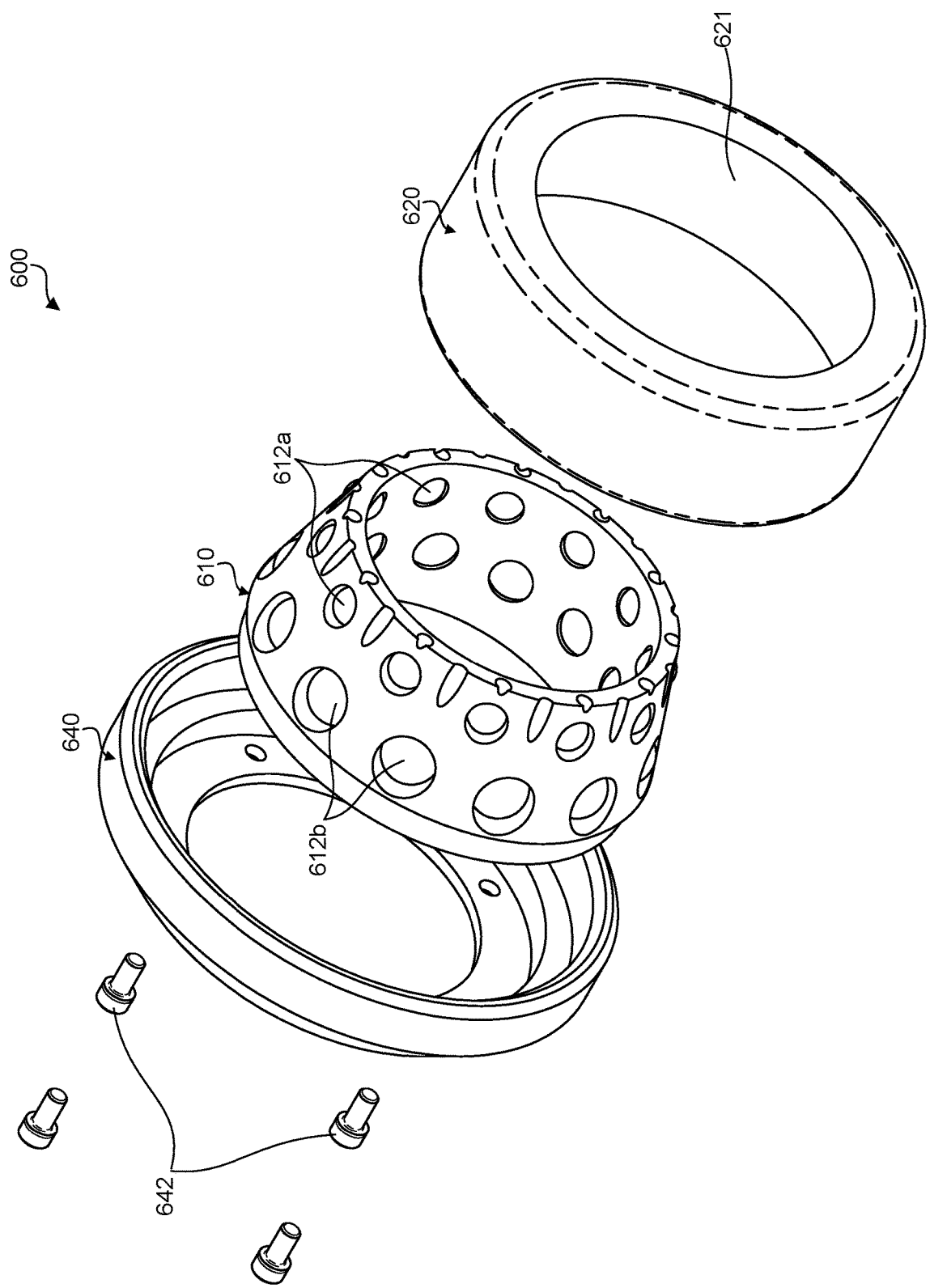
FIG. 7 is an exploded view of the linear bearing clutch shown in FIG. 6.

Radial cage 610 can be configured to hold first and second rows of contact elements 612a, 612b. Radial cage 610 can be further configured to support first and second rows contact elements 612a, 612b between tapered surface 620 and shaft 630. In some aspects, radial cage 610 can be disposed radially about shaft 630. As shown in FIGS. 6 and 7, radial cage 610 can include two or more rows of contact elements 612a, 612b. In some aspects, first and second rows of contact elements 612a, 612b can be the same. In some aspects, first and second rows of contact elements 612a, 612b can be different (e.g., different diameters, different materials). In some aspects, contact elements 612a, 612b can be arranged in a plurality of rows (e.g., concentric rows).

As shown in FIG. 8A, radial cage 610 can include first row of contact elements 612a and first row of actuators 614a coupled to first row of contact elements 612a. As shown in FIG. 8B, radial cage 610 can include second row of contact elements 612b and second row of actuators 614b coupled to second row of contact elements 612b. In some aspects, first and second rows of contact elements 612a, 612b can be configured to contact first contact surface 621 of tapered surface 620 and contact second contact surface 631 of shaft 630.

Radial cage 610 is similar to radial cage 110' shown in FIG. 3 and similar reference numbers are used to indicate the similar features of radial cage 110' shown in FIG. 3 and radial cage 610 shown in FIGS. 6-8, 8A, and 8B. Discussion of radial cage 610 components, properties, and/or functionality (e.g., rows of contact elements 612a, 612b, rows of actuators 614a, 614b) is not duplicated here for brevity, but the aspects and features of each are similar to cage 110 and radial cage 110' described above.

Tapered surface 620 can be configured to permit motion of first and second rows of contact elements 612a, 612b along first direction 602 (e.g., free direction) of shaft 630. Tapered surface 620 can be further configured to restrict motion of first and second rows of contact elements 612a, 612b in second direction 604 (e.g., locking direction) of shaft 630, second direction 604 being opposite first direction 602. As shown in FIGS. 6, 7, 8A, and 8B, tapered surface 620 can include first contact surface 621 and taper angle ($\theta$) 622.

Tapered surface 620 is similar to tapered surface 120' shown in FIG. 3 and similar reference numbers are used to indicate the similar features of tapered surface 120' shown in FIG. 3 and tapered surface 620 shown in FIGS. 6-8, 8A, and 8B. Discussion of tapered surface 620 components, properties, and/or functionality (e.g., first contact surface 621, taper angle ($\theta$) 622) is not duplicated here for brevity, but the aspects and features of each are similar to first surface 120 and tapered surface 120' described above.

Shaft 630 can be configured to be coupled to first and second rows of contact elements 612a, 612b and move relative to tapered surface 620. As shown in FIGS. 6, 8A, and 8B, shaft 630 can include second contact surface 631, shaft inner diameter 633, and shaft outer diameter 634. In some aspects, shaft 630 can include a bore (e.g., bore in earthen material) and linear bearing clutch 600 can be arranged in a second configuration (e.g., second configuration 20 shown in FIG. 4) such that tapered surface 620 and radial cage 610 are disposed within the bore.

Shaft 630 is similar to shaft 130' shown in FIG. 3 and similar reference numbers are used to indicate the similar features of shaft 130' shown in FIG. 3 and shaft 630 shown in FIGS. 6, 8, 8A, and 8B. Discussion of shaft 130' components, properties, and/or functionality (e.g., second contact surface 631) is not duplicated here for brevity, but the aspects and features of each are similar to second surface 130 and shaft 130' described above.

Housing 640 can be configured to couple radial cage 610 and tapered surface 620. As shown in FIGS. 6 and 7, housing 640 can include one or more connectors 642 (e.g., bolts, screws, etc.) to connect and secure radial cage 610 and tapered surface 620 together. In some aspects, housing 640 can be part of radial cage 610. In some aspects, housing 640 can be part of tapered surface 620.

Exemplary Flow Diagram

FIG. 9 illustrates flow diagram 900 according to an exemplary aspect. For example, flow diagram 900 can be for linear bearing clutch 100 shown in FIGS. 1 and 2. Flow diagram 900 can be configured to design a linear bearing clutch based on one or more desired materials and/or a desired geometry. Flow diagram 900 can be further configured to determine materials (e.g., Young's modulus, coefficient of static friction ($\mu$), etc.) of a linear bearing clutch to passively lock in one direction and maintain the constraint that $\mu > \tan(\theta)$. Flow diagram 900 can be further configured to determine a geometry (e.g., taper angle ($\theta$)) of a linear bearing clutch to passively lock in one direction and maintain the constraint that $\mu > \tan(\theta)$.

It is to be appreciated that not all steps in FIG. 9 are needed to perform the disclosure provided herein. Further, some of the steps may be performed simultaneously, sequentially, and/or in a different order than shown in FIG. 9. Flow diagram 900 shall be described with reference to FIGS. 1-8, 8A, and 8B. However, flow diagram 900 is not limited to those example aspects. Although flow diagram 900 is shown in FIG. 9 as a stand-alone method, the aspects of this disclosure can be used with other apparatuses, systems, and/or methods, such as, but not limited to, elements in FIGS. 1-8, 8A, and 8B, e.g., linear bearing clutch 100, linear bearing clutch 100', linear bearing clutch 100", taper locking function 510, and/or linear bearing clutch 600. In some aspects, flow diagram 900 can be implemented by one or more models or algorithms (e.g., optimization algorithm) run on one or more processors and/or computing devices based on one or more instructions stored in one or more memories.

In step 902, as shown in the example of FIGS. 1-8, 8A, 8B, one or more materials of a shaft and a linear bearing clutch can be selected. For example, materials for contact elements 112, first surface 120, and second surface 130 of linear bearing clutch 100 can be selected. In some aspects, the one or more materials can be determined based on a selected geometry and the constraint that $\mu > \tan(\theta)$.

In step 904, as shown in the example of FIGS. 1-8, 8A, 8B, one or more geometries of the linear bearing clutch can be selected. For example, geometries for contact elements 112, first surface 120, and second surface 130 of linear bearing clutch 100 can be selected. In some aspects, taper angle ($\theta$) 122 of first surface 120 of linear bearing clutch 100 can be selected. In some aspects, the geometry can be determined based on the selected materials and the constraint that $\mu > \tan(\theta)$.

In some aspects, the selecting geometries can include selecting a number of contact elements of the linear bearing clutch. In some aspects, the selecting geometries can include selecting a taper orientation such that the linear bearing clutch is in a first configuration (e.g., first configuration 10 shown in FIG. 3) in which the linear bearing clutch is disposed around the shaft. In some aspects, the selecting geometries can include selecting a taper orientation such that the linear bearing clutch is in a second configuration (e.g., second configuration 20 shown in FIG. 4) in which the linear bearing clutch is disposed within the shaft.

In step 906, as shown in the example of FIGS. 1-8, 8A, 8B, a constraint can be applied to the selected materials and/or the selected geometries such that $\mu > \tan(\theta)$. In some aspects, the coefficient of static friction ($\mu$) and/or the taper angle ($\theta$) can be determined based on a model of the linear bearing clutch and a set of parameters, including, but not limited to, taper orientation (e.g., external, internal), geometry (e.g., diameters, contact areas), materials (e.g., Young's modulus, Poisson's ratio, allowable Hertzian stress), or a combination thereof.

In some aspects, an inverse optimization of the set of parameters and the constraint $\mu > \tan(\theta)$ can be performed such that the model of the linear bearing clutch determines appropriate geometries (e.g., taper angle ($\theta$) 122, number of contact elements 112, etc.) based on the selected materials and/or determines appropriate materials (e.g., coefficient of static friction ($\mu$), Young's modulus, etc.) based on the selected geometries. In some aspects, the optimization model or optimization algorithm can include simulated annealing, gradient descent, finite difference, interpolation, population models, regression, parameter adaptation, supervised machine learning, unsupervised machine learning, neural networks, classification models, clustering, vector quantization, stochastic gradient descent, implicit updates, leaky averaging, momentum methods, adaptive gradient (AdaGrad), backpropagation, root mean square propagation (RMSProp), adaptive moment estimation (Adam), or a combination thereof. In some aspects, the inverse optimization can be performed by an optimization algorithm.

In some aspects, the coefficient of static friction (μ) and/or the taper angle (θ) can be determined based on designing the linear bearing clutch in first configuration 10 (external) relative to the shaft. In some aspects, the coefficient of static friction (μ) and/or the taper angle (θ) can be determined based on designing the linear bearing clutch in second configuration 20 (internal) relative to the shaft.

In step 908, optionally, as shown in the example of FIGS. 1-8, 8A, 8B, a number of contact elements of the linear bearing clutch can be selected. For example, a number of rows of contact elements 612a, 612b of linear bearing clutch 600 can be selected. In some aspects, a number of contact elements 612a, 612b in each row can be selected.

It is to be understood that the phraseology or terminology herein is for the purpose of description and not of limitation, such that the terminology or phraseology of the present specification is to be interpreted by those skilled in relevant art(s) in light of the teachings herein.

The above examples are illustrative, but not limiting, of the aspects of this disclosure. Other suitable modifications and adaptations of the variety of conditions and parameters normally encountered in the field, and which would be apparent to those skilled in the relevant art(s), are within the spirit and scope of the disclosure.

While specific aspects have been described above, it will be appreciated that the aspects may be practiced otherwise than as described. The description is not intended to limit the scope of the claims.

It is to be appreciated that the Detailed Description section, and not the Summary and Abstract sections, is intended to be used to interpret the claims. The Summary and Abstract sections may set forth one or more but not all exemplary aspects as contemplated by the inventor(s), and thus, are not intended to limit the aspects and the appended claims in any way.

The aspects have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the aspects that others can, by applying knowledge within the skill of the art, readily modify and/or adapt for various applications such specific aspects, without undue experimentation, without departing from the general concept of the aspects. Therefore, such adaptations and modifications are intended to be within the meaning and range of equivalents of the disclosed aspects, based on the teaching and guidance presented herein.

The breadth and scope of the aspects should not be limited by any of the above-described exemplary aspects, but should be defined only in accordance with the following claims and their equivalents.

What is claimed is:

1. A linear bearing clutch comprising:
   a first surface comprising a tapered surface;
   a second surface comprising a flat or curved surface;
   one or more contact elements; and
   a holding device configured to hold the one or more contact elements,
   wherein the first surface is configured to permit motion of the one or more contact elements along a first direction of the second surface,
   wherein the first surface is configured to restrict motion of the one or more contact elements in a second direction of the second surface, the second direction being opposite the first direction, and
   wherein the one or more contact elements comprises sprags.

2. The linear bearing clutch of claim 1, wherein the linear bearing clutch is configured to passively lock in the second direction without backlash.

3. The linear bearing clutch of claim 1, wherein the linear bearing clutch is purely mechanical.

4. The linear bearing clutch of claim 1, wherein, in a first configuration, the linear bearing clutch is arranged external to the second surface and the tapered surface has a taper angle opening along the second direction.

5. The linear bearing clutch of claim 4, wherein a coefficient of static friction between the one or more contact elements, the tapered surface, and the second surface is greater than a tangent of the taper angle.

6. The linear bearing clutch of claim 1, further comprising one or more actuators coupled to the one or more contact elements and configured to preload the one or more contact elements into contact with both the tapered surface and the second surface simultaneously.

7. The linear bearing clutch of claim 1, wherein, in a first configuration, the linear bearing clutch is arranged external to the second surface.

8. The linear bearing clutch of claim 1, wherein, in a second configuration, the linear bearing clutch is arranged internal to the second surface.

9. The linear bearing clutch of claim 1, wherein the one or more contact elements comprises ball bearings.

10. The linear bearing clutch of claim 1, wherein, in a second configuration, the linear bearing clutch is arranged internal to the second surface and the tapered surface has a taper angle opening along the first direction.

11. The linear bearing clutch of claim 10, wherein a coefficient of static friction between the one or more contact elements, the tapered surface, and the second surface is greater than a tangent of the taper angle.

12. A system comprising:
   a shaft; and
   a linear bearing clutch coupled to the shaft, the linear bearing clutch comprising:
     a first surface comprising a tapered surface;
     one or more rows of one or more contact elements; and
     a holding device configured to hold the one or more rows of the one or more contact elements,
   wherein the first surface is configured to permit axial motion of the one or more contact elements along a first direction of the shaft, wherein the first surface is configured to restrict axial motion of the one or more contact elements in a second direction of the shaft, the second direction being opposite the first direction, and wherein the one or more rows of the one or more contact elements comprises a plurality of rows of contact elements.

13. The system of claim 12, wherein a coefficient of static friction between the one or more rows of the one or more contact elements, the tapered surface, and the shaft is greater than a tangent of a taper angle of the tapered surface.

14. The system of claim 12, wherein, in a first configuration, the linear bearing clutch is disposed around the shaft.

15. The system of claim 12, wherein:
the shaft comprises a bore, and
in a second configuration, the linear bearing clutch is disposed within the bore.

16. The system of claim 12, wherein the linear bearing clutch further comprises one or more actuators coupled to the one or more rows of the one or more contact elements and configured to preload the one or more rows of the one or more contact elements into contact with the shaft and the tapered surface.

17. The system of claim 12, wherein the linear bearing clutch further comprises a housing configured to couple the holding device and the tapered surface.

18. The system of claim 12, wherein the one or more rows of the one or more contact elements comprises ball bearings, sprags, or a combination thereof.

19. The system of claim 12, wherein the shaft comprises a smooth exterior surface, a smooth interior surface, or both.

20. The system of claim 12, wherein the shaft has a triangular cross-section, an elliptical cross-section, a circular cross-section, a rectangular cross-section, a square cross-section, or an arbitrary cross-section.

21. A method of designing a linear bearing clutch, the method comprising:
selecting materials of a shaft and a linear bearing clutch coupled to the shaft, wherein the linear bearing clutch comprises contact elements and a tapered surface; and
selecting geometries of the shaft, the contact elements, and the tapered surface,
wherein the tapered surface has a taper angle and a coefficient of static friction between the contact elements, the tapered surface, and the shaft is greater than a tangent of the taper angle.

22. The method of claim 21, wherein the selecting geometries comprises selecting a number of contact elements of the linear bearing clutch.

23. The method of claim 21, wherein the selecting geometries comprises selecting a first configuration in which the linear bearing clutch is disposed around the shaft.

24. The method of claim 21, wherein the selecting geometries comprises selecting a second configuration in which the linear bearing clutch is disposed within the shaft.

* * * * *